W. F. MORAN.
DANGER SIGNAL.
APPLICATION FILED FEB. 6, 1922.
1,423,727.
Patented July 25, 1922.
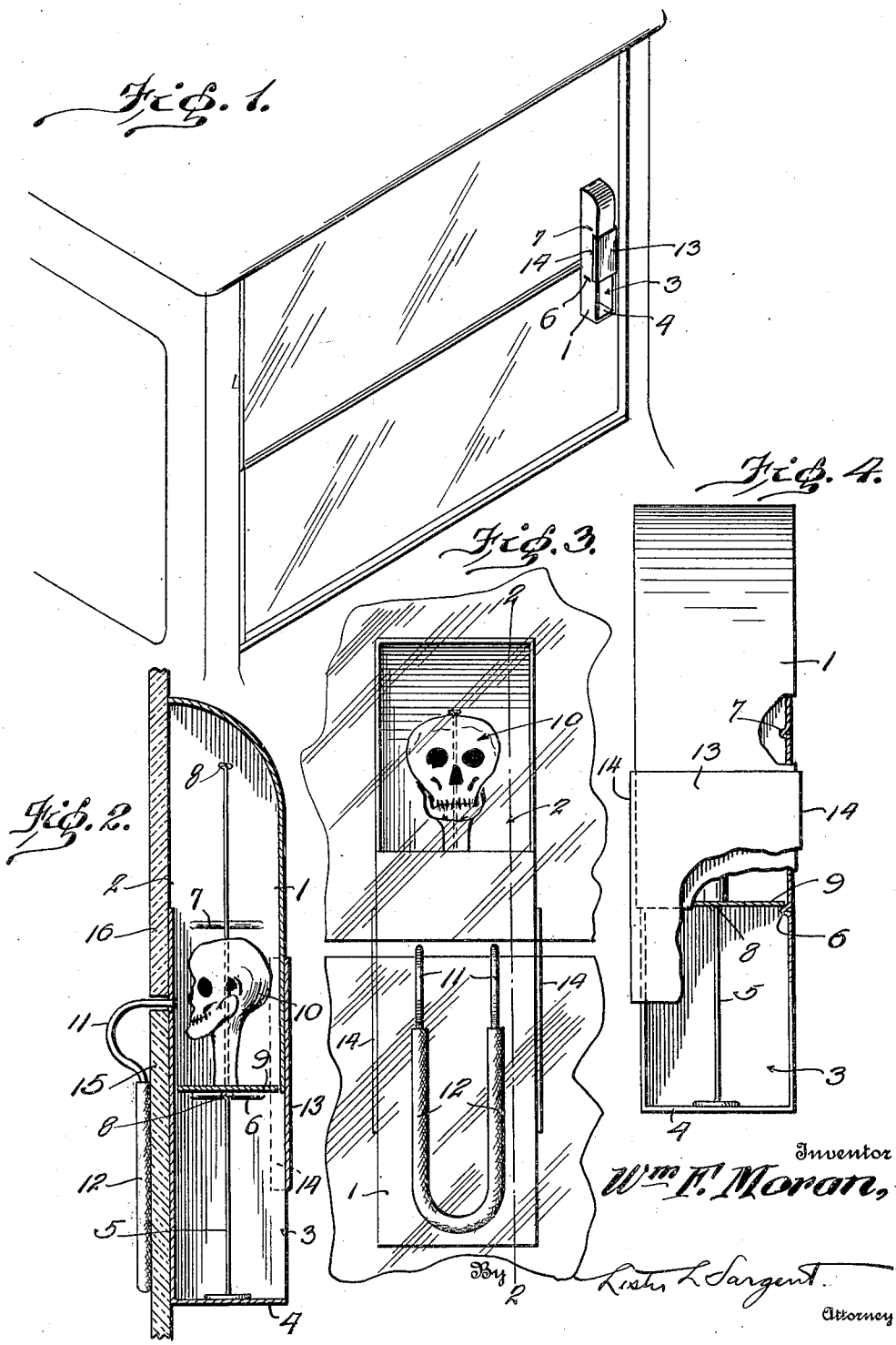
Inventor
Wm. F. Moran,
By Lester L. Sargent
Attorney

UNITED STATES PATENT OFFICE.

WILLIAM F. MORAN, OF FREDERICK, MARYLAND.

DANGER SIGNAL.

1,423,727. Specification of Letters Patent. Patented July 25, 1922.

Application filed February 6, 1922. Serial No. 534,499.

*To all whom it may concern:*

Be it known that I, WILLIAM F. MORAN, a citizen of the United States, residing at Frederick, in the county of Frederick and State of Maryland, have invented a new and useful Danger Signal, of which the following is a specification.

The object of my invention is to provide a unique novelty for attachment to automobile wind shields, which is adapted to function as a danger or warning signal when the speed of the car increases beyond a certain point; to provide a novel signalling element in such a device; to provide novel means for operating this element by the force of the air current encountered; to provide a novel means for adjusting the device to regulate the conditions under which it will operate; and to provide novel means for readily attaching the device to and holding it flat against a wind shield. I attain these and other objects of my invention by the mechanism illustrated in the accompanying drawings, in which:—

Figure 1 is a perspective view of my invention applied to the wind shield of an automobile;

Fig. 2 is a vertical section through the device when applied to a wind shield, on the section line 2—2 of Fig. 3;

Fig. 3 is a plan view of the device as seen by a person seated within the automobile; and Fig. 4 is a reverse elevational view of the device, partly in section.

Like numerals indicate like parts in each of the several views.

Referring to the accompanying drawings, I provide a casing 1 having an upper sight opening and a lower wind opening 3 on the reverse portion of the casing. Suitably attached to the bottom 4 of the casing I provide a vertical guide rod 5 positioned centrally within the casing and extending nearly to the top of the casing. Slidably mounted on the guide rod 5 I provide a vertically sliding wind board 9, to which is attached a novelty warning signal device such as the skull 10 shown in Figs. 2 and 3, member 10 also being slidably mounted on the guide rod 5 which extends vertically through member 10, as shown in Figs. 2 and 3. The range of movement of windboard 9 and signal member 10 is limited by suitable spaced stops. These stops may consist of the casing wall stops 6 and 7 and guide rod stops or bent portions 8. One set of the above described stops may be omitted if desired. Attached to the wall of the casing which has sight opening 2, I provide suitable means for releasably securing the casing to the wind shield of an automobile, such as the spring clamp 11, which preferably is provided with a suitable rubber guard member 12, as shown.

In order to make it possible to adjust the device so that the danger signal will be operated under different wind pressures, I provide a suitable adjustable slide 13 slidingly attached to the casing 1 by suitable lateral guide flanges 14.

The spring clamp 12 is engaged over the top of the lower section 15 and under the upper section 16 of a wind shield, with the wind opening 3 facing toward the front and the sight opening 2 facing toward the rear of the automobile. As the speed of the automobile increases substantially beyond a predetermined point the pressure of wind admitted through wind opening 3 will elevate the sliding wind board 9 and thus bring the warning signal member or skull 10 into view through the sight opening 2, as illustrated in Fig. 3. The amount of wind pressure admitted to the device may be regulated by vertical adjustment of slide member 13, the lateral flanges 14 of which vertically engage the sides of the casing 1.

What I claim is:—

1. In a novelty danger signal, the combination of a casing having an upper sight opening and a lower wind opening in the reverse portion of the casing, a vertical guiding means mounted in the casing, a windboard vertically slidable on said means, a danger signal element mounted on said windboard, and spaced stops for limiting the range of movement of the windboard.

2. In a novelty danger signal, the combination of a casing having an upper sight opening and a lower wind opening, said openings being positioned in reverse portions of the casing, a vertical guide rod affixed to the bottom of the casing, a windboard vertically slidable on said guide rod, a manikin danger signal mounted on said windboard and loosely slidable on the guide rod, spaced stops for limiting the range of movement of the windboard and manikin signal element, and means for releasably clamping the device on the wind shield of an automobile.

3. In combination with the apparatus described in claim 2, a vertical slidable plate member mounted on the casing and adjustable to extend partially over and regulate the size of the wind opening.

WILLIAM F. MORAN.